United States Patent [19]

Harbourne et al.

[11] Patent Number: 4,722,858
[45] Date of Patent: Feb. 2, 1988

[54] FIRE-RETARDANT SHEET MATERIAL

[75] Inventors: David A. Harbourne; Evelyn M. Lundhild, both of Kingston, Canada

[73] Assignee: Du Pont Canada Inc., Mississauga, Canada

[21] Appl. No.: 878,633

[22] Filed: Jun. 26, 1986

[30] Foreign Application Priority Data

Jul. 1, 1985 [GB] United Kingdom ............... 8516611

[51] Int. Cl.$^4$ ............................................. C08K 3/20
[52] U.S. Cl. .................................. 428/220; 524/404;
524/405; 524/436; 524/437; 524/504; 525/285
[58] Field of Search ............... 524/404, 436, 437, 504,
524/405; 428/220; 525/285

[56] References Cited

U.S. PATENT DOCUMENTS

| 3,956,236 | 5/1976 | Gaylord | 524/425 |
| 4,071,494 | 1/1978 | Gaylord | 525/285 |
| 4,071,581 | 1/1978 | Yokoyama | 525/285 |
| 4,464,495 | 8/1984 | Brown | 524/87 |

FOREIGN PATENT DOCUMENTS

| 884935 | 11/1971 | Canada | 400/77 |
| 55-112248 | 8/1980 | Japan | |
| 0011507 | 1/1983 | Japan | 525/285 |

OTHER PUBLICATIONS

Derwent Abs. 72552 C/41 (8–80), Japan 55112248.
Derwent Abs. 26473 C/15 (3–80), Japan 55–029542.
Derwent Abs. 703481/27 (C83–063519), Japan 58–091715, Sumitomo.
Derwent Abs. 44870k/19 (C83–043649), Japan 58–053438, Sumitomo.

Primary Examiner—Herbert J. Lilling

[57] ABSTRACT

A fire-retardant sheet material, the manufacture thereof and a fire-retardant polymer composition are disclosed. The sheet is manufactured from a composition of polyethylene, 55 to 75% by weight of the composition of alumina trihydrate and/or magnesium hydroxide, and optionally zinc borate and/or calcium carbonate, at least 2% by weight of the composition being in the form of a graft copolymer with an ethylenically unsaturated carboxylic acid or anhydride. The composition has a melt index of 0.05 to 4.0 dg/min. In an embodiment, the graft copolymer has a shear viscosity at 200° C. and a shear rate of 400 sec$^{-1}$ that is not more than 50% of that of the polyethylene. The sheet material may be used for, in particular, ceiling tile. In embodiments of the composition, 60 to 90% by weight may be alumina trihydrate and/or magnesium hydroxide, and optionally zinc borate and/or calcium carbonate.

31 Claims, No Drawings

FIRE-RETARDANT SHEET MATERIAL

BACKGROUND OF THE INVENTION

1. Field of the Invention

The present invention relates to fire-retardant sheet material and especially to such sheet material obtained from a polyethylene composition and intended for use in the construction and building industries.

2. Description of the Prior Art

Fire-retardant plastic compositions are known in the art. The polymer of such compositions is often polyvinyl chloride, or a related polymer, or the compositions contain halogenated compounds as flame-retardant agents. Although such compositions may have commercially-acceptable properties, there are concerns about flame-retardant compositions that contain halogenated matter, especially with respect to the toxicity and corrosivity of the decomposition products that may be formed when articles fabricated from such fire-retardant compositions are subjected to heat and/or fire.

Compositions, with fire-retardant properties, that do not contain halogenated materials are also known. Such compositions may be based on polyolefins, polyamides or the like and contain filler materials e.g. so-called alumina trihydate (Al(OH)$_3$), magnesium hydroxide, calcium carbonate, antimony trioxide, clay and the like. Such compositions are often used in the wire coating industry.

Sheet structures are used in the construction and building industries. For example, such structures may be used as ceiling tiles, wall panels, vertical blinds or the like. It is preferable and/or necessary that such sheet structures have flame-retardant properties. In particular, it is advantageous for such structures to be capable of meeting the requirements of a burn test conducted according to the procedures of ASTM E-84, especially the characteristics of Flame Spread Index (FSI) and Smoke Density (SD). Such characteristics may be specified in governmental regulations and/or be included in specifications of other organizations, e.g. the Underwriters Laboratories of Canada and the U.S.A., and be embodied in building codes or guidelines, or the like.

A compatibilized filled polyolefin composition comprising a hydroxyl-containing filler encapsulated in a polyolefin having a relatively high melt index and subsequently compounded with a polyolefin having a relatively low melt index is disclosed in Canadian Pat. No. 884 935 of N. G. Gaylord, issued Nov. 2, 1981. The encapsulation of the filler may be carried out in the presence of an ethylenically unsaturated carboxylic acid or anhydride under conditions that generate free radicals.

In Japanese patent application No. 55 112 248, published Aug. 29, 1980, H. Nakae et al disclosed compositions comprising 50–300 parts of particulate inorganic compound, per 100 parts of polyolefin, and 1–50 parts of maleic polymer per 100 parts of inorganic compound. Polyethylene having a density of 0.910–0.945 g/cm$^3$ and a melt index of 0.01–2.0 dg/min is the preferred polyolefin. Maleic polymer was defined as polymer containing succinic acid groups, especially maleic polybutadiene and polypropylene graft modified with maleic anhydride. The maleic polymers were stated to be of relatively low molecular weight, preferably 1000–5000, and to melt and soften at less than 100° C.

SUMMARY OF THE INVENTION

It has now been found that fire-retardant sheet material may be formed from polyolefin compositions.

Accordingly, the present invention provides a fire-retardant sheet material having a thickness of at least 250 μm, said sheet material having been formed from a composition comprising:

(a) 10 to 45% by weight of the composition of a polyolefin selected from the group consisting of: (i) homopolymers of ethylene and butene, (ii) copolymers of ethylene with at least one hydrocarbon alpha-olefin having 3 to 10 carbons, (iii) graft copolymers formed by grafting 0.2 to 2% by weight of at least one of an ethylenically unsaturated carboxylic acid and an ethylenically unsaturated carboxylic acid anhydride onto a hydrocarbon polymer, said hydrocarbon polymer being a polymer of at least one of ethylene and butene having a melt index of less than 100 dg/min. and (iv) mixtures thereof, with the proviso that at least 2% by weight of the composition is said graft copolymer; and (b) 55 to 90%, by weight of the composition, of a filler, said filler comprising 40 to 100% by weight of at least one of alumina trihydrate and magnesium hydroxide and 0 to 60% by weight of at least one of zinc borate and calcium carbonate;

said composition having a melt index in the range of 0.05 to 4.0 dg/min.; and said fire-retardant sheet having a Flame Spread Index of less than 150 and a Smoke Density of less than 300, as measured by the procedures of ASTM E-84.

In a preferred embodiment of the sheet material of the present invention, the graft copolymer is a maleic anhydride-grafted polymer of ethylene.

In another embodiment, the sheet material has a Flame Spread Index (FSI) of less than 150, especially less than 25, and a Smoke Density of less than 300, especially less than 50.

The present invention also provides a composition comprising:

(a) 10 to 45% by weight of the composition of a polyolefin selected from the group consisting of: (i) homopolymers of ethylene and butene, (ii) copolymers of ethylene with at least one hydrocarbon alpha-olefin having 3 to 10 carbon atoms, (iii) graft copolymers formed by grafting 0.2 to 2% by weight of at least one of an ethylenically unsaturated carboxylic acid and an ethylenically unsaturated carboxylic acid anhydride onto a hydrocarbon polymer, said hydrocarbon polymer being a polymer of at least one of ethylene and butene having a melt index of less than 100 dg/min., and (iv) mixtures thereof, with the proviso that at least 2% by weight of the composition is said graft copolymer; and (b) 55 to 90%, by weight of the composition, of a filler, said filler comprising 40 to 100% by weight of at least one of alumina trihydrate and magnesium hydroxide and 0 to 60% by weight of zinc borate and calcium carbonate, said composition having a melt index in the range of 0.05 to 4.0 dg/min.

In addition, the present invention provides a process for forming a fire-retardant sheet material, comprising the steps of:

(A) feeding to an extruder adapted for the extrusion of sheet a composition comprising:

(a) 25 to 45% by weight of the composition of a polyolefin selected from the group consisting of: (i) homopolymers of ethylene and butene, (ii) copolymers of ethylene with at least one hydrocarbon alpha-olefin having 3 to 10 carbon atoms, (iii) graft copolymers formed by grafting 0.2 to 2% by weight of at least one of an ethylenically unsaturated carboxylic acid and an ethylenically unsaturated carboxylic acid anhydride onto a hydrocarbon polymer, said hydrocarbon polymer being a polymer of at least one of ethylene and butene having a melt index of less than 100 dg/min., and (iv) mixtures thereof, with the proviso that at least 2% by weight of the composition is said graft copolymer; and (b) 55 to 75% by weight of the composition, of a filler, said filler comprising 40 to 100% by weight of at least one of alumina trihydrate and magnesium hydroxide and 0 to 60% by weight of at least one of zinc borate and calcium carbonate;

said composition having a melt index in the range of 0.05 to 4.0 dg/min., (B) heating said composition to a temperature above the melting point of the polyolefin but less than the temperature of decomposition of the filler; and (C) extruding said molten composition through a sheeting die and cooling the sheet so obtained, said sheet having a thickness of at least 250 μm.

In a preferred embodiment of the process of the present invention, the composition has been compounded prior to being fed to the extruder adapted for the extrusion of sheet.

DETAILED DESCRIPTION OF THE INVENTION

The polyolefin of the present invention is formed from homopolymers of ethylene and butene and/or copolymers of ethylene and at least one $C_3$–$C_{10}$, especially $C_4$–$C_{10}$, hydrocarbon alpha-olefin. Examples of such hydrocarbon alpha-olefins are butene-1, hexene-1 and octene-1. The preferred polyolefins are homopolymers of ethylene and copolymers of ethylene and $C_4$–$C_{10}$ hydrocarbon alpha-olefins; such preferred polyolefins are generally referred to herein as polyethylene and the present invention is particularly described hereinafter with reference to polyethylene as the polyolefin.

The density of the polyethylene will depend on the intended end-use of articles, especially sheet, fabricated from the compositions and the properties desired in such articles. High densities tend to give relatively stiff, brittle sheet whereas lower densities tend to give relatively flexible, tough sheet. The polyethylene will have densities of at least 0.890 g/cm$^3$, especially 0.910–0.965 g/cm$^3$. In preferred embodiments, the polyethylene has a density in the range of 0.935 to 0.955 g/cm$^3$ and especially in the range of 0.940 to 0.945 g/cm$^3$.

The polyethylene preferably has a melt index in the range of 5–30 dg/min., especially 8–20 dg/min. Polymers of broad molecular weight distribution may exhibit better processability in the preparation of the compositions than polymers of narrow molecular weight distribution. In the sheeting process, the melt index is preferably 8–20 dg/min. In preferred embodiments of the present invention, especially for polymers of narrow molecular weight distribution, the polyethylene has a melt index of 10 to 15 dg/min.

In an embodiment, the polyethylene is a blend comprising 55 to 75%, especially 60 to 70%, by weight of polyethylene having a melt index in the range of 3 to 10 dg/min, melt index being measured by the method of ASTM D-1238 (Condition E). In a preferred embodiment, the melt index of such polyethylene is in the range of 4 to 7 dg/min. The polyethylene of such a blend also comprises 25 to 45%, especially 30 to 40%, by weight, of polyethylene having a melt index in the range of 30 to 80 dg/min. In a preferred embodiment, the melt index of the latter polyethylene is in the range of 40 to 55 dg/min. The polyethylene having the higher melt index is preferably an ethylene/hydrocarbon alpha-olefin copolymer as defined above and of lower density than the other polyethylene of the blend as polyethylenes of lower density tend to have lower melting points. The combination of higher melt index and lower melting point tends to facilitate the compounding of the compositions of the present invention.

The blend will normally be prepared by admixing at least two polyethylenes to form a blend of the intended composition. Such blending is preferably achieved by physically admixing pellets, granules, powder or other comminuted shapes of the polyethylenes. As an alternative, the polyethylene blend may be a synthesized blend e.g. obtained by the use of multiple reactors and/or multiple monomer injection in an olefin polymerization process. It is preferred, however, that the polyethylene blend be formed by blending synthesized polymers, not by in situ synthesis in a polymerization process.

The polyethylene comprises 10 to 45% by weight of the composition. However, for some methods for fabrication of articles, especially sheet extrusion processes, the polyethylene should be at least 25% of the composition.

The compositions of the present invention also contain 55 to 90%, especially 55 to 75% and more particularly 60 to 72%, by weight of the composition, of a filler. Of this filler, 40 to 100 parts by weight is alumina trihydrate viz. Al(OH)$_3$ and/or magnesium hydroxide. In embodiments, all of the filler is alumina trihydrate or all of the filler is magnesium hydroxide. The remainder of the filler i.e. 0 to 60 parts by weight, is zinc borate and/or calcium carbonate. It is to be understood that the compositions may also contain pigment, especially 1 to 4% by weight of pigment, as well as stabilizers and the like shown for polyethylene. Any such pigment forms a portion of the up to 60 parts by weight of filler that may otherwise be zinc borate and/or calcium carbonate. In an embodiment, the filler is alumina trihydrate and pigment.

In order to facilitate processing of the compositions of the invention, it is preferred that the filler have a broad particle size distribution. In an embodiment, the filler has a coarse fraction and a fine fraction, in which the major portion of the fine fraction has a particle size in the range of about 0.5 to 5 μm and a median of about 1.5 μm, and a major portion of the coarse fraction has a particle size in the range of about 1 μm to 35 μm and a median of about 12 μm. The filter should have 40 to 60% by weight of the coarse fraction. High proportions of fine particles in the composition may cause processing difficulties, especially at high filler contents, but may be advantageous with respect to properties of the sheet that is obtained.

Of the polyethylene portion of the compositions of the invention, at least 2% and especially 2 to 2%, by weight of the composition is a graft copolymer. The graft copolymer is formed by the grafting of an ethylenically unsaturated carboxylic acid, or derivative thereof, especially ethylenically unsaturated carboxylic acid anhydride, onto a hydrocarbon polymer backbone. Preferably, the graft monomer is maleic acid or maleic anhydride. The hydrocarbon polymer is a polymer of at least one of ethylene and butene, especially a homopolymer of ethylene or a copolymer of ethylene with $C_4$–$C_{10}$ hydrocarbon alpha-olefins e.g. copolymers of ethylene with propylene, butene-1, hexene-1 and/or octene-1, or polybutene. Techniques for the preparation of grafted copolymers are known in the art, preferred examples of which are disclosed in the Canadian patent applications of G. White and of C. S. Wong and R. A. Zelonka, both filed June 27, 1985. Grafted copolymers may also be prepared by thermal reaction of maleic anhydride with polyethylene at temperatures of at least about 375° C. Grafted copolymers are also available commercially from Mitsui Petrochemical Industries under the trade mark Admer.

While the use of the graft copolymer in the compositions of the invention may facilitate compatibility of filler and polyethylene in the compositions, the graft copolymer has more significant effects on the physical properties of the compositions and articles fabricated therefrom. In particular, as is illustrated hereinafter, increasing the graft copolymer content of a composition may have significant and beneficial effects on, for example, toughness properties of the compositions and articles.

The graft copolymer used in the present invention has a melt index of less than 100 dg/min. and especially in the range 5–100 dg/min. The preferred range of melt index of the graft copolymer is 10–30 dg/min. In embodiments, the composition contain 5 to 10 by weight of graft copolymer.

In preferred embodiments, the graft copolymer of the composition has a shear viscosity at 200° C. and a shear rate of 400 sec$^{-1}$ that is not more than 50% of that of the polyethylene of the composition. Preferably the shear viscosity of the graft copolymer is not more than 30% of that of the polyethylene.

The compositions of the invention have a melt index in the range of 0.05 to 4.0 dg/min., especially 0.5 to 2.5 dg/min.; melt index is measured by the procedure of ASTM D-1238 (Condition E).

The compositions of the invention may be fed directly to an extruder equipped for profiled extrusion, especially the manufacture of sheet. However, in that event, the extruder would need to be adapted for intensive mixing as the compositions of the invention require a high degree of mixing both for uniformity of product and for extrudability. It is believed that feeding the compositions to a single screw extruder not adapted for intensive mixing will likely result in processing difficulties.

It is preferred that the compositions of the invention be pre-mixed or compounded prior to being fed to an extruder adapted for profiled extrusion, especially the manufacture of sheet. For instance, the compositions may be compounded using a twin screw extruder, a high intensity fluxing mixer e.g. a Gelimat* mixer, a Farrel* continuous mixer or a Banbury* mixer. The use of such equipment is illustrated hereinafter. All of such equipment is adapted for intensive mixing or compounding of the composition. The compounding equipment should be operated at temperatures of less than the decomposition temperature of the filler, it being understood that if the composition contains more than one filler, the temperature is lower than the lowest decomposition temperature of such fillers. For example, the temperature should not be higher than 200° C. when the filler contains alumina trihydrate. If temperatures higher than the decomposition temperatures are used, the fire-retardant properties of the sheet obtained may be affected deleteriously.
*denotes trade mark The compositions of the invention, preferably in a compounded form, are fed to an extruder equipped for profiled extrusion, especially the manufacture of sheet. The composition is heated to a temperature above the melting point of the polyethylene, but less than the decomposition temperature of the filler. The molten composition is then extruded through, for example, a sheeting die, such dies being known. The resultant sheet is then cooled. The sheet has a thickness of at least 250 $\mu$m, preferably 400 to 600 $\mu$m and especially 500 to 750 $\mu$m. The thickness of the sheet will depend, in particular, on the intended end-use.

The sheet obtained from the process of the present invention may be used in a variety of end-uses that require or advantageously can utilize flame retardant sheet. In particular, the sheet may be used in the construction and building industries. An example of such use is as a ceiling tile. In such an end-use, the sheeting will normally be pigmented, especially with a white pigment e.g. titanium dioxide. For ceiling tiles, it is preferred that the tile have sufficient flexibility and toughness to withstand handling during installation and cleaning. Ceiling tile made according to the present invention may be cleaned by wiping or the like. The ceiling tile may have holes, especially holes that have been punched in the tile, or the like for acoustical or other reasons.

As is illustrated hereinafter, embodiments of sheeting of the present invention are acapable of meeting the requirements of the burn test set forth in ASTME-84, entitled "Surface Burning Characteristics of Building Materials". The Method is stated to be applicable to exposed surfaces e.g. ceilings or walls, provided that the material or assembly is capable of supporting itself in position or being supported during the test period. Flame spread along the test sample and smoke density 'eveloped are reported, the comparative surface being red oak. The test exposes a nominal 7.32 m×0.51 m sample to a controlled air flow and flaming fire exposure adjusted to spread the flame along the entire length of a red oak specimen in 5.5 minutes.

Flame spread is determined from the rate of spread of flame on the test specimen; the flame spread rating, known as Flame Spread Index (FSI) and discussed in ASTM E-84, is determined from the area under the curve on a graph of flame spread distance along the test specimen against time, over the initial period of ten minutes of the burn test of ASTM E-84. Smoke density (SD) is based on a value of zero for asbestos-cement board and 100 for red oak. In both instances, lower values represent superior fire retardant properties. Values of less than 150 and 300 for FSI and SD, respectively, are deemed to be acceptable for many end-uses. Preferred values of FSI and SD are 25 and 50, respectively. The values reported herein were determined by Underwriters Laboratories of Toronto, Ontario, Canada.

In addition to fabrication of compositions into the form of sheet, as described above, compositions of the invention may be formed into articles using other processes e.g. injection moulding processes. As is illustrated hereinafter, a range of compositions may be injection moulded into articles, but it is to be understood that, depending on such factors as the physical shape and characteristics of the mould and the article to be moulded and the injection moulding apparatus, some compositions may not be suitable for use in injection moulding processes, as will be understood be those skilled in the art. Compositions of high filler content tend to have higher melt viscosities and be less amenable to use in injection moulding processes.

The present invention is illustrated by the following examples.

EXAMPLE I

A series of compositions were prepared and compounded using a high intensity fluxing mixer. The compounded compositions were then fed to a single screw extruder equipped with a sheeting die. The compositions were extruded into sheet using the method described above and cooled.

Samples of the sheet were tested in the burn test (ASTM E-84) in which both Flame Spread Index (FSI) and Smoke Density (SD) were determined, as discussed above.

Further details and the results obtained are given in Table I.

EXAMPLE II

A series of compositions were compounded using a Gelimat mixer. The compounded compositions were then pressed into plaques having a thickness of about 1250 μm.

Further details of the compositions and results obtained are given in Table II. Melt indices of the compositions were not determined; Runs 20, to 24 and 27 are comparative runs and all other runs are believed to be of compositions within the scope of the invention.

When organic salts of carboxylic acids and organic titanates were used as compatibilizer, instead of graft copolymer, the plaques obtained were very brittle.

In Runs 22 and 23 extrusion during compounding was not stable; the composition tended to be extruded in "spurts".

Runs 9 and 12 show the effect on pressure drop of a small increase in filler content. Runs 14 to 16 show the effect of a different compatibilizer in Run 16. Runs 16 and 25, for instance, show effects of polyethylene composition.

The use of ethylene/methacrylic acid copolymer as compatibilizer gave plaques that were not quite as good as with the maleic anhydride graft copolymer but superior to the BYK and LICA agents.

TABLE I

| RUN NO. | 1 | 2 | 3 | 4 | 5 | 6 | 7 | 8 |
|---|---|---|---|---|---|---|---|---|
| Polyethylene* | | | | | | | | |
| 2907 (%) | 100 | 100 | 46 | 46 | 46 | 67 | 67 | 60 |
| 2107 (%) | — | — | 25 | 25 | 25 | — | — | — |
| 2114 (%) | — | — | 29 | 29 | 29 | 33 | 33 | 40 |
| Filler** | | | | | | | | |
| (% of composition) | | | | | | | | |
| ATH (%) | 40 | 53.5 | 35 | 34 | 32 | 65 | 65 | 65 |
| Zn Borate | — | — | 32 | 31 | 32 | — | — | — |
| Pigment (TiO$_2$) | — | — | — | 2 | 3 | 3 | 3 | 3 |
| Graft Copolymer*** | 6 | 5 | 3 | 3 | 3 | 5 | 5 | 5 |
| (% of composition) | | | | | | | | |
| Sheet Thickness (microns) | 900 | 1275 | 1025 | 500 | 850 | 700 | 575 | 625 |
| Composition Melt Index (dg/min) | NA | 1.2 | 1.3 | 0.6 | 0.1 | 0.05 | 0.2 | 0.8 |
| Burn Test**** | | | | | | | | |
| FSI | 185 | 255 | 20 | 8 | 24 | 15 | 10 | 2 |
| SD | 110 | 90 | 30 | 10 | 50 | 75 | 28 | 18 |

*2907 = SCLAIR 2907 polyethylene, an ethylene homopolymer having a density of 0.960 g/cm$^3$ and a melt index of 5.0 dg/min.
2107 = SCLAIR 2107 polyethylene, an ethylene/butene-1 copolymer having a density of 0.924 g/cm$^3$ and a melt index of 5.1 dg/min.
2114 = SCLAIR 2114 polyethylene, an ethylene/butene-1 copolymer having a density of 0.924 g/cm$^3$ and a melt index of 53 dg/min.
**ATH = Alumina trihydrate, obtained from Solem Industries, Inc. of Norcross, Georgia, U.S.A. In Runs 1 to 5, the alumina trihydrate had a relatively small particle size; in the other runs, the alumina trihydrate was an admixture of relatively small and large particle sizes in a ratio of about 1:1.
***In Runs 1 to 6 and 8, the graft compolymer was an ethylenically unsaturated carboxylic acid grafted high density polyethylene containing about 1% grafted monomer, melt index 12 dg/min., having a narrow molecular weight distribution.
In Run 7, the graft copolymer was a maleic anhydride grafted low density ethylene/butene-1 copolymer containing about 0.6% maleic anhydride, melt index 8 dg/min., having a broad molecular weight distribution.
****Determined by Underwriters Laboratories of Toronto, Ontario, according to the procedure of ASTM E-84. In Runs 4 to 7, the sheet had punched holes, to simulate ceiling tile.
****Runs 1 and 2 are comparative runs and are not of the present invention.

TABLE II

| Run No. | 9 | 10 | 11 | 12 | 13 | 14 | 15 | 16 | 17 | 18 | 19 |
|---|---|---|---|---|---|---|---|---|---|---|---|
| Polyethylene* | | | | | | | | | | | |
| 2907 (%) | 30 | 13.3 | 18 | 27 | 12 | 18 | 16 | 18 | 27 | 12 | 14.7 |
| 2914 (%) | — | 6.7 | 9 | — | 6 | — | — | — | — | 6 | — |
| 2107 (%) | — | 6.7 | — | — | 6 | 9 | 8 | 9 | — | 6 | — |
| 2114 (%) | — | 3.3 | — | — | 3 | — | — | — | — | 3 | 7.3 |
| Filler | 64 | 65.7 | 67.1 | 66.1 | 69.4 | 66.8 | 69.4 | 65.3 | 63.5 | 66.5 | 71.0 |
| (% of composition) | | | | | | | | | | | |

TABLE II-continued

| Graft copolymer*** (% of composition) | 5 | 5 | 5 | 5 | 5 | 5 | 5 | 5 | 5 | 10 |
|---|---|---|---|---|---|---|---|---|---|---|
| Pressure Drop**** | 338 | 282 | 303 | 380 | 303 | 352 | 423 | 303 | 380 | 303 | 409 |

| Run. No. | 20 | 21 | 22 | 23 | 24 | 25 | 26 | 27 | 28 | 29 |
|---|---|---|---|---|---|---|---|---|---|---|
| Polyethylene* | | | | | | | | | | |
| 2907 (%) | 20.5 | 20.5 | 20.5 | 20.5 | 20.5 | 18 | 14.7 | 14.7 | 18 | 18 |
| 2914 (%) | — | — | — | — | — | 9 | 7.3 | 7.3 | — | — |
| 2107 (%) | 10.2 | 10.2 | 10.2 | — | 10.2 | — | — | — | 9 | 9 |
| 2114 (%) | — | — | — | — | — | — | — | — | — | — |
| Filler | 72.0 | 69.9 | 70.8 | 70.5 | 61.8 | 66.5 | 70.2 | 72.4 | 70.1 | 70.2 |
| (% of composition) | | | | | | | | | | |
| Graft copolymer*** | — | — | — | — | 5 | 5 | 10 | — | 5 | 5 |
| (% of composition) | | | | | | | | | | |
| Pressure Drop**** | 338 | 289 | — | — | 373 | 240 | 310 | 416 | 465 | 430 |

*2907 = SCLAIR 2907 polyethylene, an ethylene homopolymer having a density of 0.960 g/cm³ and a melt index of 5.0 dg/min.
2914 = SCLAIR 2914 polyethylene, an ethylene homopolymer having a density of 0.960 g/cm³ and a melt index of 50 dg/min.
2107 = SCLAIR 2107 polyethylene, an ethylene/butene-1 copolymer having a density of 0.924 g/cm³ and a melt index of 5.1 dg/min.
2114 = SCLAIR 2114 polyethylene, an ethylene/butene-1 copolymer having a density of 0.924 g/cm³ and a melt index of 53 dg/min.
**Filler was alumina trihydrate and titanium dioxide pigment. The values reported were determined on the compounded compositions, from measurements of the ash content. The compositions contained 3% by weight of the composition of $TiO_2$. The alumina trihydrate was MICRAL 932, from Solem Industries, in all runs except Runs 17 and 18 where SB 332 was used and Run 29 where a mixture of MICRAL 932 (34%) and SB 332 (30.9%) was used. In Run 28, part of the alumina trihydrate was replaced with zinc borate, to give 34.0% alumina trihydrate and 30.9% zinc borate (by weight of composition).
***In Runs 9 to 15, 17 to 19, 28 and 29, the graft copolymer was the ethylenically unsaturated acid grafted high density polyethylene of Example I. In Run 24, the graft copolymer was similar except that the base polymer was an elastomer, the amount of grafted monomer was about 1.7% and the melt index was 3 dg/min.
In Runs 16, 25 and 26, the graft copolymer was the maleic anhydride grafted copolymer of Example I.
In Run 20, the graft copolymer was replaced with BYK 5316, an organic salt of carboxylic acid, obtained from BYK-Chemie USA of Wallingford, Conn., U.S.A.
In Runs 21 to 23, the graft copolymer was replaced with LICA 01, LICA 09 and LICA 44 neoalkoxy titanates, respectively, obtained from Kenrich Petrochemicals Inc. of Bayonne, N.J., U.S.A.
IN Run 27, the graft copolymer was replaced with Nucrel ® 910 ethylene/methacrylic acid copolymer.
****Pressure Drop was determined in the following manner: the composition was extruded through a single screw Brabender extruder at 190° C. and a screw speed of 20 rpm. The die was a capillary die in which the capillary had a diameter of 1.52 mm and a length of 4.57 cm. The pressure in the extruder immediately prior to the capillary die was measured, and is reported as the pressure drop across the capillary die, in kg/cm². Pressure drop is a measure of melt viscosity of the composition. Low values of pressure drop are preferred; values above about 400 kg/cm² indicate potential difficulties in extrusion.

EXAMPLE III

A composition was prepared from polypropylene, aluminum trihydrate and graft copolymer. The polypropylene was 18%, by weight of the composition, of Profax 7523 polypropylene obtained from Himont Canada Inc. (density 0.898 g/cm³, melt flow 5 dg/min) blended with 12%, by weight of the composition, of ST 6100 polypropylene obtained from Shell Chemical Company (density 0.905 g/cm³, melt flow 12 dg/min). The graft copolymer was a maleic anhydride-grafted ethylent/butene-1 copolymer (density 0.924 g/cm³, melt index 29 dg/min) containing about 0.6% by weight of maleic anhydride. The composition contained 6% by weight of graft copolymer.

The composition was compounded using a Gelimat mixer and the resultant was fed to a single screw extruder equipped with a sheeting die. The composition was extruded into sheet using the method described in Example I and cooled. Samples of the sheet were tested in the burn test (ASTM E-84) in which both flame spread index (FSI) and smoke density (SD) were determined, as discussed above.

Further details and the results obtained are given in Table III as Run 30.

The results show that sheet having excellent flame retardant properties may be obtained using polypropylene.

TABLE III

| RUN NO. | 30 | 31 | 32 | 33 | 34 | 35 | 36 |
|---|---|---|---|---|---|---|---|
| Polyethylene (%) | — | 26 | 26 | 26 | 29 | 29 | 29 |
| Polypropylene (%) | 30 | — | — | — | — | — | — |
| Filler (% of composition) | 56 | 68 | 68 | 68 | 65 | 65 | 65 |
| Mean Particle Size of Filler (microns) | — | 1.5 | 3.5 | 5.8 | 1.5 | 3.5 | 5.8 |
| Graft Copolymer (% of compsition) | 6 | 6 | 6 | 6 | 6 | 6 | 6 |
| Sheet Thickness (microns) | 640 | 640 | 640 | 640 | 640 | 640 | 640 |
| Burn Test | | | | | | | |
| FSI | 50 | 18 | 11 | 13 | 9 | 7 | 12 |
| SD | 55 | 55 | 32 | 47 | 45 | 42 | 72 |

EXAMPLE IV

A series of compositions were compounded using a Gelimat mixer. The polymer was a blend, in a ratio of 3:2, of SCLAIR 2907 (homopolymer of ethylene, density 0.960 g/cm³, melt index 5 dg/min) and SCLAIR 2114 (ethylene/butene-1 copolymer, density 0.924 g/cm³, melt index 53 dg/min) polyethylene. The graft polymer was the same as in Example III.

The alumina trihydrate was obtained from Salem Industries and was as follows:
(i) ATH 932 having a mean particle size of 1.5 microns;
(ii) ATH 632 having a mean particle size of 3.5 microns; and
(iii) ATH 332 having a mean particle size of 10 microns.

A blend having a "mean particle size of 5.8 microns" was prepared by blending ATH 932 and ATH 332 in a ratio of 1:1.

Sheet was prepared and tested using the procedure of Example III. Further details and the results obtained are given in Table III, as Runs 31-36.

The results show that particle size has no apparent effect on flame retardant properties.

EXAMPLE V

The series of compositions were prepared and compounded using a Gelimat mixer. The polymer was polyethylene and the filler was magnesium hydroxide. The compounded compositions were then fed to a single screw extruder.

It was found that the compositions of Runs 37-40 could be extruded through a Brabender single screw extruder, equipped with a 1.9 cm screw and a 20:1 length:diameter capillary die, using a melt temperature of 180° C.; the method was similar to the measurement of pressure drop described in Example I. However, the composition of Run 41 could not be extruded through a single screw extruder equipped with a 8.9 cm screw and a sheeting die, thereby showing that extrusion of compositions may be dependent on the equipment being used.

Further details of the compositions are as follows:

| RUN NO. | 37 | 38 | 39 | 40 | 41 |
|---|---|---|---|---|---|
| Polyethylene |  |  |  |  |  |
| 2907 (%) | 18 | 15 | 16 | 12 | 13 |
| 2114 (%) | 12 | 10 | 16 | 20 | 19 |
| Filler | 65 | 70 | 65 | 65 | 66 |
| (% of composition) |  |  |  |  |  |
| Graft Copolymer** | 5 | 5 | 3 | 3 | 3 |
| (% of composition) |  |  |  |  |  |

*see Table I
**the graft copolymer was the same as in Example III.

This Example illustrates the preparation of compositions containing magnesium hydroxide filler.

EXAMPLE VI

A series of copositions were prepared and compounded using a Gelimat mixer. The polymer was polyethylene and the filler was aluminum trihydrate admixed with either calcium carbonate or zinc borate.

The compounded compositions of Runs 45 and 46 were extruded into sheet using a single screw extruder equipped with a 8.9 cm screw and a sheeting die.

Further details of the compositions are as follows:

| RUN NO. | 42 | 43 | 44 | 45 | 46 |
|---|---|---|---|---|---|
| Polyethylene* |  |  |  |  |  |
| 2907 (%) | 18 | 15 | 16 | 16 | 14 |
| 2107 (%) | — | — | — | — | 7 |
| 2114 (%) | 12 | 10 | 16 | 16 | 9 |
| Filler |  |  |  |  |  |
| (% of composition) |  |  |  |  |  |
| ATH 932 (%) | 26 | 28 | 26 | 26 | 35 |
| $CaCO_3$ (%) | 39 | 42 | 39 | 39 | — |
| Zinc borate (%) | — | — | — | — | 32 |
| Graft Copolymer** | 5 | 5 | 3 | 3 | 3 |
| (% of composition) |  |  |  |  |  |

*See Table I
**In Runs 42-45, the graft copolymer was the maleic anhydride-grafted copolymer of Example III. In Run 46, the graft copolymer was the graft copolymer of Runs 1-6 (Example I).

The sheet of Run 45 was subjected to the burn test, and values of 41 for FSI and 44 for SD were obtained.

This Example illustrates the preparation of compositions and sheet in which the filler is calcium carbonate or zinc borate.

EXAMPLE VII

To illustrate the effect of amount of filler, a series of compositions were prepared and compounded using a Gelimat mixer. The polymer was polyethylene, the filler was aluminum trihydrate (ATH 332) and the graft copolymer was the maleic anhydride-grafted copolymer of Example III.

Melt index of the compounded compositions was measured by the procedure of ASTM D-1238 (Condition E).

Further details of the compositions were as follows:

| RUN NO. | 47 | 48 | 49 | 50 | 51 | 52 | 53 |
|---|---|---|---|---|---|---|---|
| Polyethylene* |  |  |  |  |  |  |  |
| 2907 (%) | 21 | 18 | 15 | 12 | 9 | 6 | 0 |
| 2114 (%) | 14 | 12 | 10 | 8 | 6 | 4 | 5 |
| Filler | 60 | 65 | 70 | 75 | 80 | 85 | 90 |
| (% of composition) |  |  |  |  |  |  |  |
| Graft Copolymer | 5 | 5 | 5 | 5 | 5 | 5 | 5 |
| (% of composition) |  |  |  |  |  |  |  |
| Melt Index** | 3.5 | 2.7 | 1.4 | 0.6 | 0.1 | NM | NM |

*see Example I
**Melt index could not be measured for Runs 52 and 53. Attempts to measure melt index for the composition of Run 51 were hindered because the capillary of the apparatus became plugged.

Although melt index could not be measured for the compositions of Runs 52 and 53, those compositions could still be pressed into plaques.

The composition discharged from the Gelimat mixer in Runs 47-50 was in the form of a lump of the molten composition. However in Run 51 the discharged composition was in the form of "pellets" and in Run 52 the discharged composition was in the form of a "coated powder".

EXAMPLE VIII

To illustrate the effect of the type of polyethylene, a series of compositions were prepared and compounded using a Gelimat mixer. Each mixture contained 65% by weight of aluminum trihydrate (ATH 932) and 5% by weight of the maleic anhydride-grafted copolymer of Example III.

Further details of the compositions were as follows:

| RUN NO. | 54 | 55 | 56 | 57 | 58 | 59 | 60 |
|---|---|---|---|---|---|---|---|
| Polyethylene* |  |  |  |  |  |  |  |
| 2909 (%) | 30 | — | — | — | — | — | — |
| 2907 (%) | — | 20 | 20 | — | — | 30 | 10 |
| 2107 (%) | — | — | — | 20 | — | — | — |
| 2114 (%) | — | 10 | — | 10 | — | — | 20 |
| 2914 (%) | — | — | 10 | — | — | — | — |
| 0701 (%) | — | — | — | — | 30 | — | — |
| Melt Index** | 0.52 | 0.40 | 0.75 | 0.33 | 0.13 | 0 | 1.0 |
| (dg/min) |  |  |  |  |  |  |  |
| Shear Rate*** | 630 | 570 | 620 | 650 | 620 | — | 630 |
| ($sec^{-1}$) |  |  |  |  |  |  |  |
| Viscosity*** | 630 | 615 | 600 | 640 | 515 | — | 540 |
| ($N \cdot sec/m^2$) |  |  |  |  |  |  |  |

*See Table I
2909 = SCLAIR 2909 polyethylene, an ethylene homopolymer having a density of 0.960 g/cm³ and a melt index of 13.5 dg/min.
2914 = SCLAIR 2914 polyethylene, an ethylene homopolymer having a density of 0.960 g/cm³ and a melt index of 50 dg/min.
0701 = UC 0701 obtained from Union Carbide Corporation a polyethylene having a density of 0.920 g/cm³ and a melt index of 5 dg/min.
This Example illustrates that the nature of the polyethylene does have an effect on the preparation and processability of the compositions.
**as determined by the procedure of ASTM D-1238 (Condition E)
***measured on extrusion through a single screw Brabender extruder at 180° C. and a screw speed of 50 rpm. The die was a capillary die in which the capillary had a diameter of 1.52 mm and a length of 3.05 cm.

EXAMPLE IX

A series of compositions were prepared and compounded using a Gelimat mixer. Each composition was prepared using two polymers of propylene.

All of the compositions formed appeared to be homogeneous.

Further details of the compositions were as follows:

| RUN NO. | 61 | 62 | 63 | 64 | 65 |
|---|---|---|---|---|---|
| Polypropylene | | | | | |
| 7523 (%) | — | — | — | 18 | 18 |
| 6431 (%) | 18 | 18 | 18 | — | — |
| ST6100 (%) | 12 | 12 | 12 | 12 | 12 |
| Filler (% of composition) ATH 932 (%) | 65 | 65 | 65 | 65 | 65 |
| Graft Copolymer** (% of composition) | | | | | |
| MA-g-2113 | 5 | — | — | 5 | — |
| MA-g-PB | — | — | 5 | — | — |
| E-43 | — | 5 | — | — | 5 |
| Melt Index*** (dg/min) | 0.5 | 1.2 | 0.2 | 0.1 | 0.8 |
| Shear Rate*** (sec$^{-1}$) | 259 | 265 | 363 | 245 | 266 |
| Viscosity*** (N · sec/M$^2$) | 1250 | 870 | 510 | 1120 | 850 |

*7523 = PROFAX ® 7523, obtained from Himont Canada Inc., a propylene copolymer having a density of 0.898 g/cm$^3$ and a melt flow of 5 dg/min.
6431 = PROFAX 6431, obtained from Himont Canada Inc., a propylene homopolymer having a density of 0.92 g/cm$^3$ and a melt flow of 6.5 dg/min.
ST6100 = SHELL ST6100, obtained from Shell Chemical Company, a propylene copolymer having a density of 0.905 g/cm$^3$ and a melt flow of 12 dg/min.
**MA-g-2113 = the graft copolymer of Example III
MA-g-PB = PB 8340 polybutene obtained from Shell Chemical Company (melt index about 4 dg/min), grafted with 0.2% by weight of maleic anhydride.
E-43 = Epolene ® maleated polypropylene wax, molecular weight about 450.

The samples obtained in Runs 61–63, made using a blend of homopolymer of propylene and copolymer of ethylene and propylene, were brittle. The samples of run 65, made using a copolymer of ethylene and propylene and maleated polypropylene wax as "graft copolymer" were also brittle. In contrast, the samples of Run 64, made using a copolymer of ethylene and propylene and grafted ethylene copolymer, exhibited a substantially higher degree of toughness.

EXAMPLE X

A series of compositions were prepared using polybutene as the polymer. The compositions was compounded using a Gelimat mixer.

Further details of the compositions were as follows:

| RUN NO. | 67 | 68 | 69 |
|---|---|---|---|
| Polybutene* | | | |
| PB 0300 (%) | 18 | — | — |
| PB 0400 (%) | 12 | 30 | 35 |
| Filler** (% of composition) ATH 932 (%) | 65 | 65 | 65 |
| Graft Copolymer** (% of composition) | 5 | 5 | 0 |

The compositions obtained were in the form of cohesive lump but additional mixing would have been required to achieve homogeneity; some unmixed pellets of polybutene were observable in the compounded compositions, including in comparative Run 69.
*PB 0300 = SHELL PB 0300, obtained from Shell Chemical Company, a polybutene having a density of 0.915 g/cm$^3$ and a melt index of 4 dg/min.
PB 0400 = SHELL PB 0400, obtained from Shell Chemical Company, a polybutene having a density of 0.915 g/cm$^3$ and a melt index of 20 dg/min.
**as in Example III

EXAMPLE XI

To illustrate the effect of amount of compatibilizer, a series of compositions were prepared and compounded using a Gelimat mixer. In Runs 70–74 below, the ratio of SCLAIR 2907 polyethylene:SCLAIR 2114 polyethylene was maintained at 3:2.

The compositions were injection moulded into test bars, which were subjected to the procedures of ASTM D 790 and D 256 to measure flexural modulus and notched Izod impact strength.

Further details of the compositions and the results obtained were as follows:

| RUN NO. | 70 | 71 | 72 | 73 | 74 | 75 | 76 |
|---|---|---|---|---|---|---|---|
| Polyethylene* | | | | | | | |
| 2907 (%) | 18 | 15 | 12 | 9 | 6 | — | — |
| 2114 (%) | 12 | 10 | 8 | 6 | 4 | 5 | — |
| Filler (% of composition) ATH 932 (%) | 65 | 65 | 65 | 65 | 65 | 65 | 65 |
| Graft Copolymer** (% of composition) | 5 | 10 | 15 | 20 | 25 | 30 | 35 |
| Melt Index (dg/min) | 0.9 | 0.4 | 0.12 | 0.10 | 0.03 | 0.05 | 0.02 |
| Shear Rate (sec$^{-1}$) | 225 | 225 | 230 | 235 | 220 | 220 | 215 |
| Viscosity (N · sec/m$^2$) | 1066 | 1150 | 1210 | 1265 | 1300 | 1240 | 1380 |
| Flexural Modulus (GPa) | 2.74 | 2.08 | 1.86 | 1.63 | 1.48 | 1.20 | 1.21 |
| Notched Izod (Joules/m) | 48 | 176 | 230 | 256 | 272 | 299 | 315 |

*see Example I
**as in Example III

This Example illustrates that the amount of graft copolymer does have an effect on melt index and viscosity of the compositions. Moreover, the addition of the graft copolymer used in this Example reduced the stiffness, as measured by flexural modulus, of the compositions but resulted in a substantial increase in the toughness, as measured by notched Izod impact strength, of the compositions.

EXAMPLE XII

Using the procedure of Example II, two compositions (Runs 77 and 78) were prepared as follows: 13.3% by weight of SCLAIR 2708M3 polyethylene, an ethylene/butene-1 copolymer having a density of 0.951 g/cm$^3$, a melt index of 5.5 dg/min and a medium molecular weight distribution (stress exponent 1.5); 6.7% by weight of SCLAIR 2107 polyethylene; 70% by weight of ATH 932 alumina trihydrate and 10% of a maleated wax. In Run 77, the maleated wax was Epolene ® E-43 maleated polypropylene wax, which has a molecular weight of about 450. In Run 78, the maleated wax was Epolene ® C-18 maleated polyethylene wax, which has a molecular weight of 4000.

Plaques pressed from the compositions of Run 77 and Run 78 were very brittle.

We claim:

1. A fire-retardant sheet material having a thickness of at least 250 μm, said sheet material having been formed from a composition comprising:
   (a) 10 to 45% by weight of the composition of a polyolefin selected from the group consisting of: (i) homopolymers of ethylene and butene, (ii) copolymers of ethylene with at least one hydrocarbon alpha-olefin having 3 to 10 carbons, (iii) graft copolymers formed by grafting 0.2 to 2% by weight of at least one of an ethylenically unsaturated carboxylic acid or derivative thereof onto a hydrocarbon polymer, said hydrocarbon polymer being a polymer of at least one of ethylene and butene having a melt index of less than 100 dg/min., and (iv) mixtures thereof, with the proviso that at least 2% by weight of the composition is said graft copolymer; and
   (b) 55 to 90% by weight of the composition of a filler, said filler comprising 40 to 100% by weight of at least one of alumina trihydrate and magnesium hydroxide, and 0–60% by weight of at least one of zinc borate and calcium carbonate;

said composition having a melt index in the range of 0.05 to 4.0 dg/min.; and said fire-retardant sheet having a Flame Spread Index of less than 150 and a Smoke Density of less than 300, as measured by the procedures of ASTM E-84.

2. The sheet material of claim 1 in which the graft copolymer is formed by grafting at least one of an ethylenically unsaturated carboxylic acid and an anhydride thereof onto a homopolymer of ethylene or a copolymer of ethylene and at least one C$_4$–C$_{10}$ hydrocarbon alpha-olefin, or admixtures thereof.

3. The sheet material of claim 2 in which the polyolefin is a homopolymer of ethylene or a copolymer of ethylene and at least one C$_4$–C$_{10}$ hydrocarbon alpha-olefin, or mixtures thereof.

4. The sheet material of claim 3 in which the composition comprises 25 to 45% by weight of polyolefin and 55 to 75% by weight of filler.

5. The sheet material of claim 4 in which the acid is maleic acid and the anhydride is maleic anhydride.

6. The sheet material of claim 5 in which the sole polyolefin is graft copolymer.

7. The sheet material of claim 5 in which the polyolefin is a blend of graft copolymer and at least one of a homopolymer of ethylene and a copolymer of ethylene and at least one C$_4$–C$_{10}$ hydrocarbon alpha-olefin.

8. The sheet material of claim 7 in which the sheet material has a Flame Spread Index of less than 25 and a Smoke Density of less than 50.

9. The sheet material of claim 8 in which the polymers of ethylene have densities in the range of 0.890 to 0.965 g/cm$^3$.

10. The sheet material of claim 8 in which the polymers of ethylene have densities in the range of 0.935 to 0.955 g/cm$^3$.

11. The sheet material of claim 7 in which the polyolefin contains 2.0 to 20% by weight of graft copolymer.

12. The sheet material of claim 10 in which the polymer of ethylene blended with the graft copolymer is 45 to 75% by weight of polymer of ethylene having a melt index of 3 to 10 dg/min. and 25 to 45% by weight of polymer of ethylene having a melt index of 30 to 80 dg/min.

13. The sheet material of claim 5 in which the polyolefin has a melt index in the range of 5 to 30 dg/min.

14. The sheet material of claim 5 in which the graft copolymer has a melt index in the range of 5 to 100 dg/min.

15. The sheet material of claim 1 in the form of a ceiling tile.

16. The sheet material of claim 8 in the form of a ceiling tile.

17. The sheet material of claim 1 in which the thickness of the sheet material is in the range of 400 to 6000 μm.

18. A composition comprising:
   (a) 10 to 45% by weight of the composition of a polyolefin selected from the group consisting of: (i) homopolymers of hydrocarbon alpha-olefins having 2 to 4 carbon atoms, (ii) copolymers of ethylene with at least one hydrocarbon alpha-olefin having 3 to 10 carbon atoms, (iii) graft copolymers formed by grafting 0.2 to 2% by weight of at least one of an ethylenically unsaturated carboxylic acid or derivative thereof onto a hydrocarbon polymer, said hydrocarbon polymer being a polymer of at least one of ethylene and butene, and (iv) mixtures thereof, with the proviso that at least 2% by weight of the composition is said graft copolymer; and ,p1
   (b) 55 to 90% by weight of the composition of a filler, said filler comprising 40 to 100% by weight of at least one of alumina trihydrate and magnesium hydroxide, and 0 to 60% by weight of at least one of zinc borate and calcium carbonate;

said composition having a melt index in the range of 0.5 to 4.0 dg/min.

19. The composition of claim 18 in which the polyolefin is a homopolymer of ethylene or a copolymer of ethylene and at least one C$_4$–C$_{10}$ hydrocarbon alpha-olefin, or mixtures thereof.

20. The composition of claim 18 in which the polyolefin is a copolymer of ethylene and propylene.

21. The composition of claim 18 in which the polyolefin is polybutene.

22. The composition of claim 19 in which the graft copolymer is formed by grafting at least one of an ethylenically unsaturated carboxylic acid and an anhydride thereof onto a homopolymer of ethylene or a copolymer of ethylene and at least one C$_4$–C$_{10}$ hydrocarbon alpha-olefin, or mixtures thereof.

23. The composition of claim 22 in which the acid is maleic acid and the anhydride is maleic anhydride.

24. The composition of claim 23 in which the sole polyolefin is graft copolymer.

25. The composition in claim 23 in which the polyolefin is a blend of graft copolymer and at least one of a homopolymr of ethylene and a copolymer of ethylene and at least one $C_4$–$C_{10}$ hydrocarbon alpha-olefin.

26. The composition of claim 25 in which the polymers of ethylene have densities in the range of 0.890 to 0.965 g/cm$^3$.

27. The composition of claim 25 in which the polymers of ethylene have densities in the range of 0.935 to 0.955 g/cm$^3$.

28. The composition of claim 25 in which the polyolefin contains 2.0 to 20% by weight of graft copolymer.

29. The composition of claim 27 in which the polymer of ethylene blended with the graft copolymer is 55 to 75% by weight of polymer of ethylene having a melt index of 3 to 10 dg/min. and 25 to 45% by weight of polymer of ethylene having a melt index of 30 to 80 dg/min.

30. The composition of claim 23 in which the polyolefin has a melt index in the range of 5 to 30 dg/min.

31. The composition of claim 23 in which the graft copolymer has a melt index in the range of 5 to 100 dg/min.

* * * * *

UNITED STATES PATENT OFFICE
CERTIFICATE OF CORRECTION

PATENT NO. : 4,722,858
DATED : February 2, 1988
INVENTOR(S) : DAVID A. HARBOURNE and EVELYN M. LUNDHILD It is certified that error appears in the above-identified patent and that said Letters Patent are hereby corrected as shown below:

Claim 12, Column 16, line 14, "45" should be -- 55 --.

Claim 18, Column 16, line 45, ", pl"should be deleted.

Claim 25, Column 17, line 6, "homopolymr" should be -- homopolymer --.

Signed and Sealed this

Twenty-eighth Day of June, 1988

Attest:

DONALD J. QUIGG

Attesting Officer          Commissioner of Patents and Trademarks